Feb. 6, 1945.   C. E. WYRICK   2,368,736
TURRET TOOL HOLDER
Filed Aug. 24, 1940   11 Sheets-Sheet 1

Inventor
CLAYTON E. WYRICK,

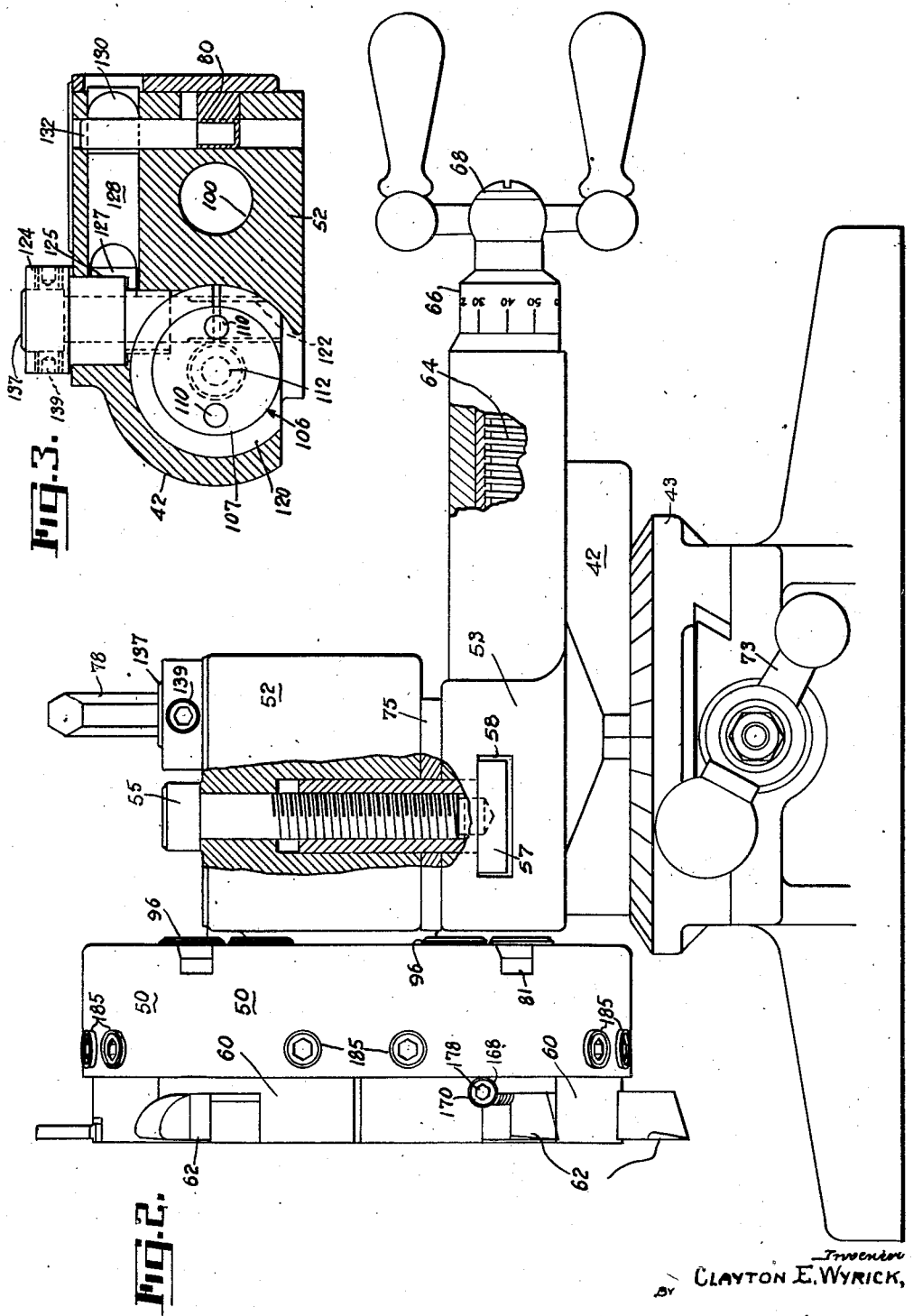

Feb. 6, 1945.   C. E. WYRICK   2,368,736
TURRET TOOL HOLDER
Filed Aug. 24, 1940   11 Sheets-Sheet 3

Inventor
CLAYTON E. WYRICK
By
Attorneys

Feb. 6, 1945. C. E. WYRICK 2,368,736
TURRET TOOL HOLDER
Filed Aug. 24, 1940 11 Sheets-Sheet 4
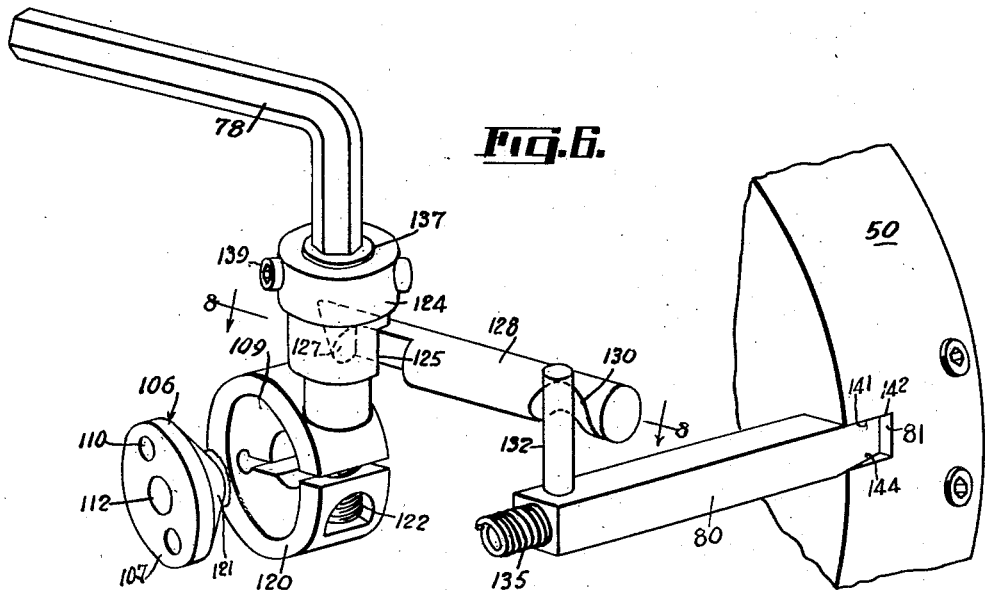
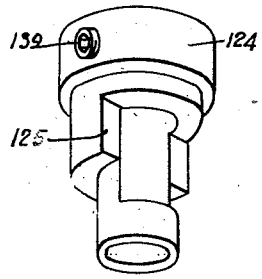
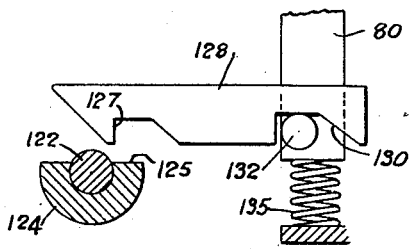
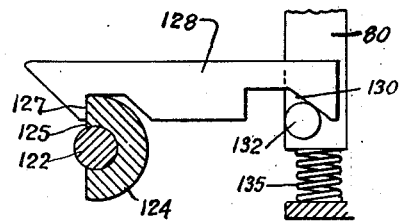
Inventor
CLAYTON E. WYRICK,
Attorneys

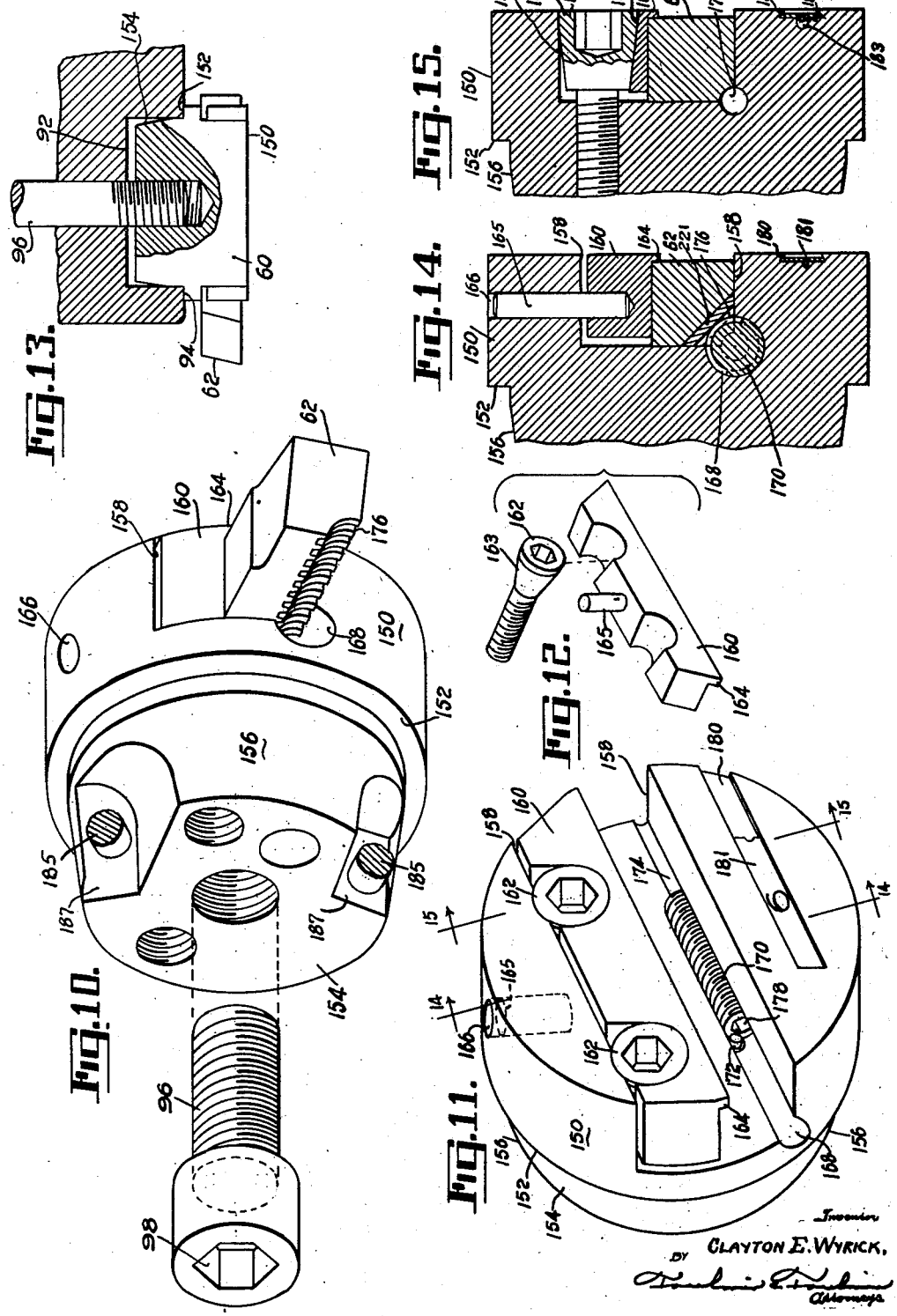

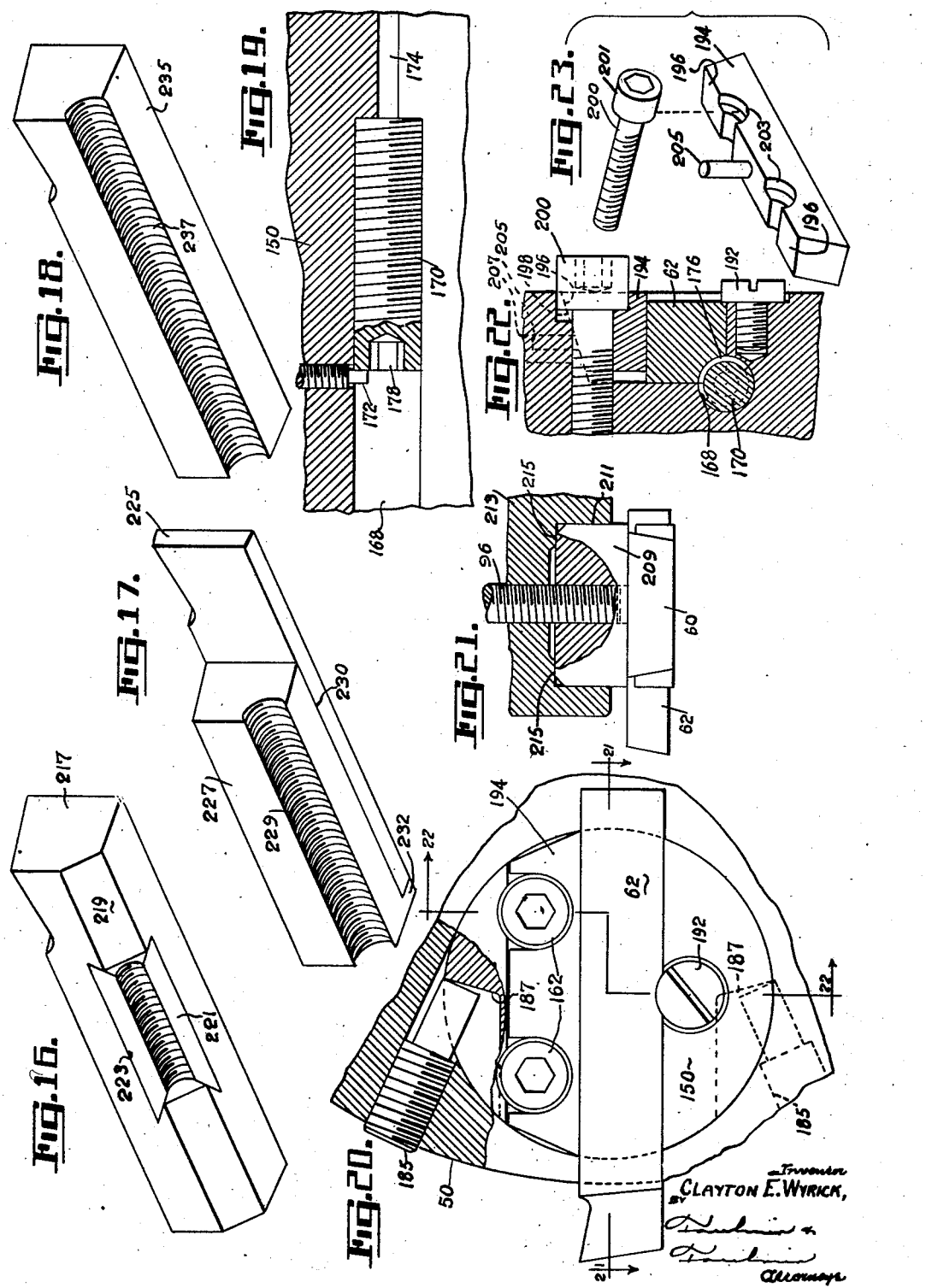

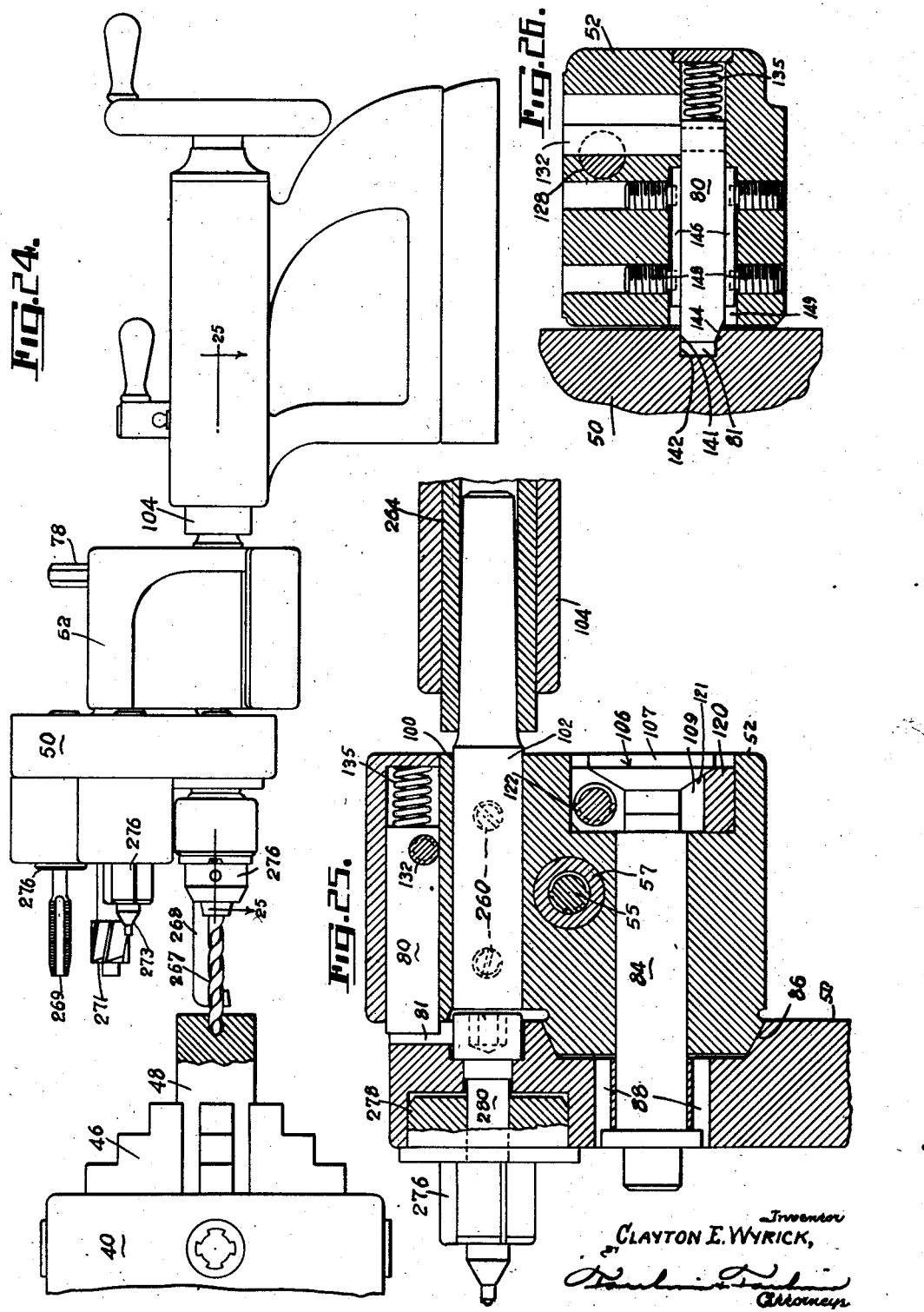

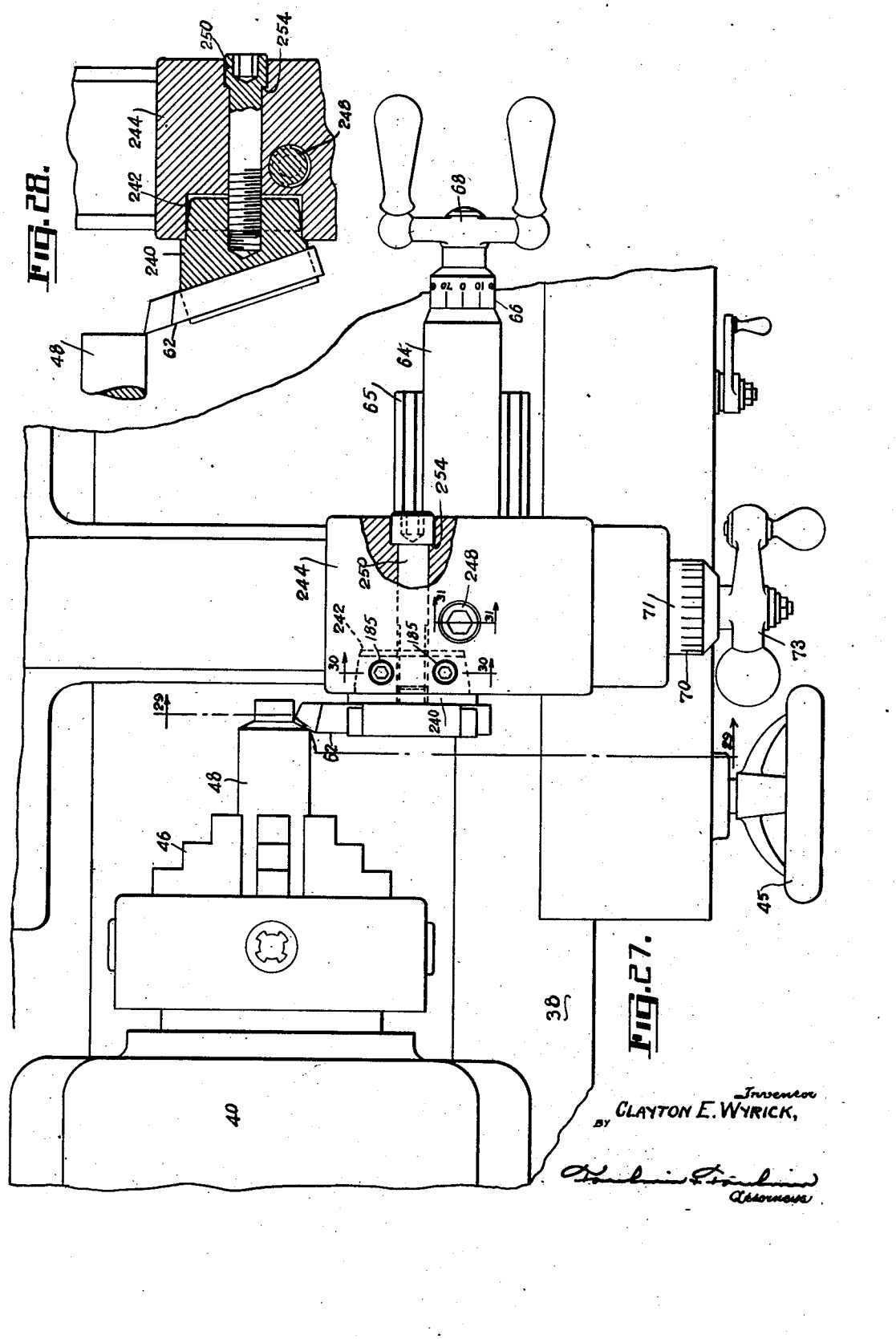

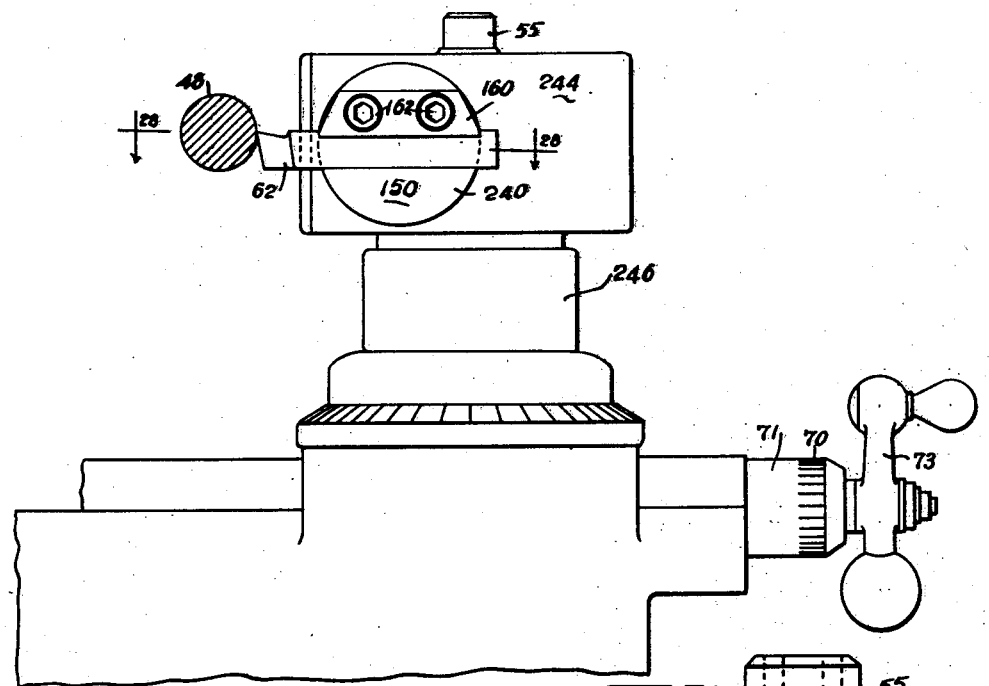
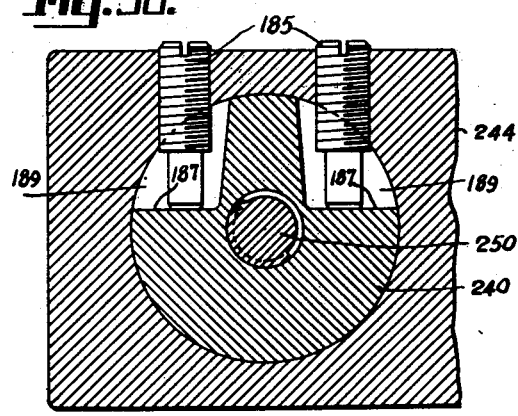
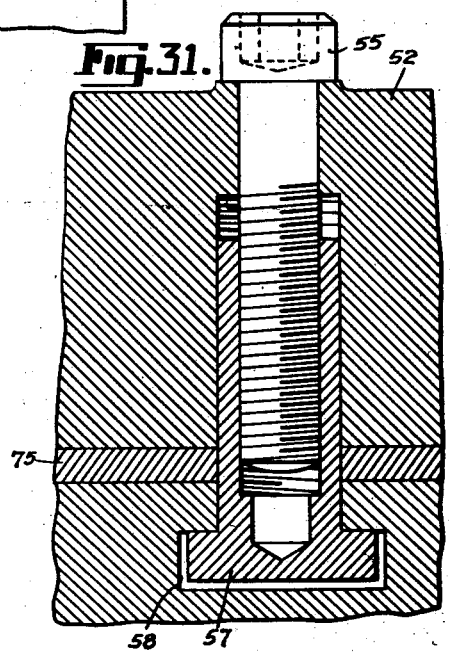

Feb. 6, 1945. C. E. WYRICK 2,368,736
TURRET TOOL HOLDER
Filed Aug. 24, 1940 11 Sheets-Sheet 10
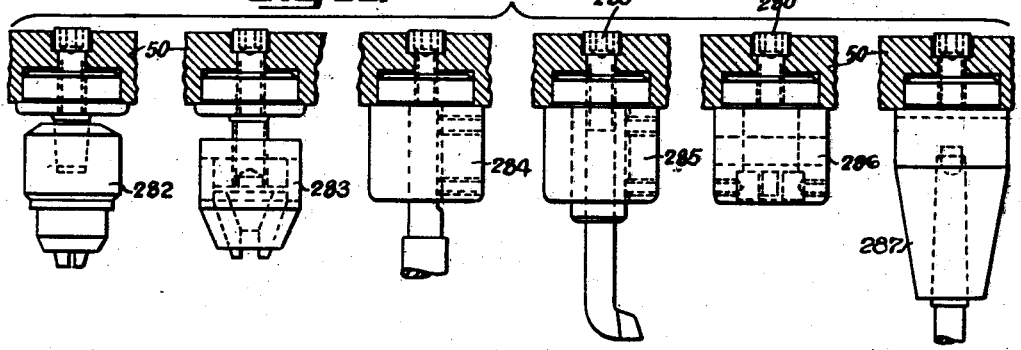
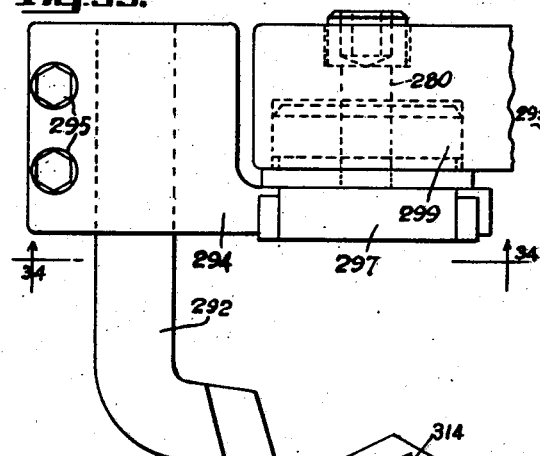
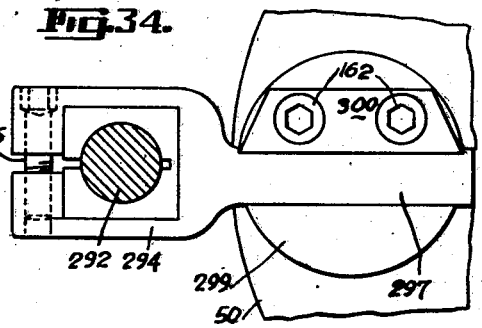
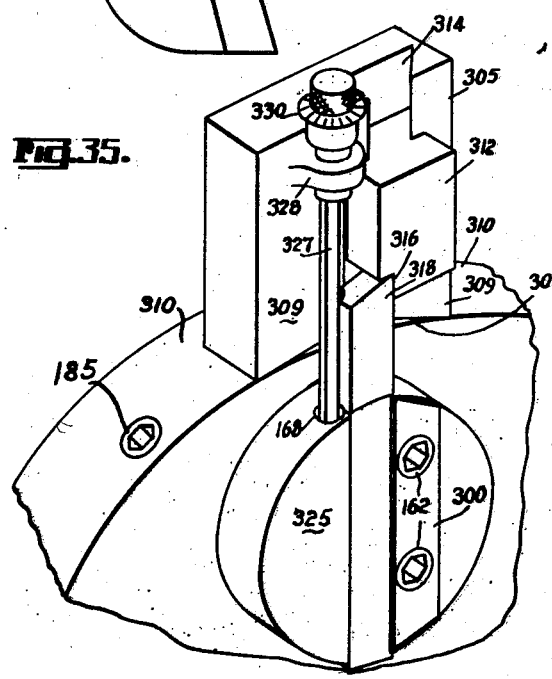
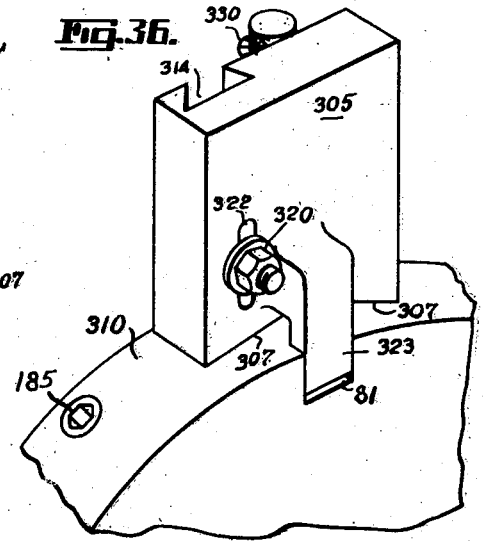
Inventor
Clayton E. Wyrick,
Attorneys Feb. 6, 1945. C. E. WYRICK 2,368,736
TURRET TOOL HOLDER
Filed Aug. 24, 1940 11 Sheets-Sheet 11
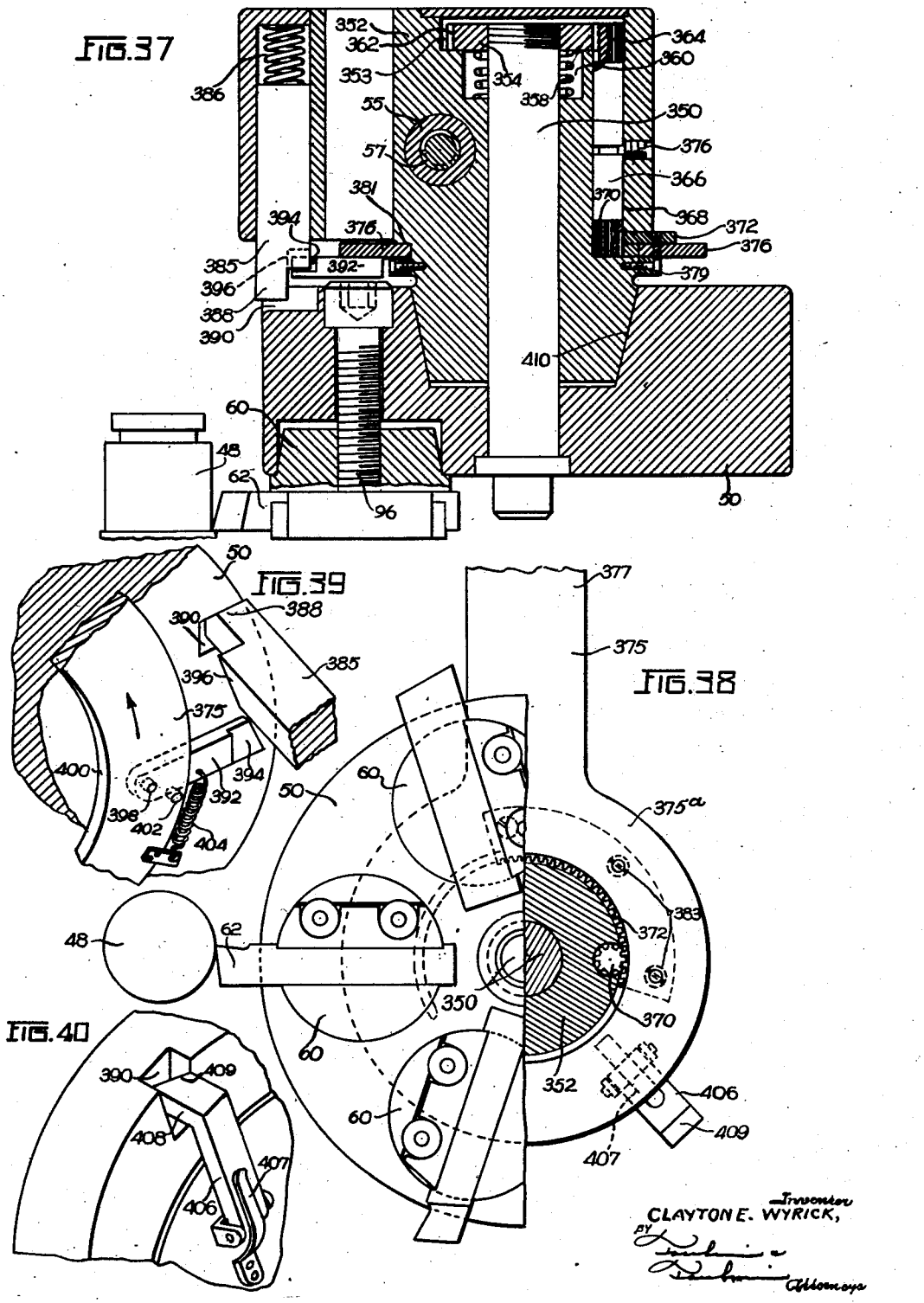
CLAYTON E. WYRICK, Patented Feb. 6, 1945

2,368,736

UNITED STATES PATENT OFFICE 2,368,736

TURRET TOOLHOLDER

Clayton E. Wyrick, Dayton, Ohio

Application August 24, 1940, Serial No. 354,084

25 Claims. (Cl. 29—48)

My invention relates to improvements in tool attachments for lathes, boring, drilling and the like machines. The invention more particularly relates to an indexible tool holder attachment having provision for adjustably holding a plurality of tools thereon.

One object of this invention is to provide a turret tool holder carrying a number of tools for performing different operations and wherein the turret is adapted for mounting on either the cross slide or tail stock of a lathe machine.

Another object is to provide a novel tool holder for fixedly retaining a variety of tools thereon so that any desired tool can be readily and quickly brought into working position and rigidly locked in place whereby accurate machine operations can be performed.

Another object is to devise a turret type tool holder having machine tools mounted thereon whereby the tools may be quickly removed individually or as a group attached to the turret.

Another object is to provide an improved tool holder which comprises adjustable clamping means whereby the holder is rigidly and solidly supported against vibration and chattering.

Another object is to provide an improved tool holder mechanism having adjustable feeding means which can be gauged whereby one or more work-pieces can be accurately cut or machined with a single setting.

Another object is to provide an improved turret type tool holder which is mountable on a lathe cross feed member and is readily operable in close proximity to the chuck or workpiece retaining means.

Another object is to devise a turret tool member which is of novel construction and adapted for mounting a boring or the like tool thereon so that it can be adjusted laterally of the turret member.

Another object is to devise an improved tool holder member for lathes and the like machines which is simple to adjust and wherein the tool head is positively locked against rotation by merely manipulating a lever.

Another object is to devise an improved tool holder which permits mounting of the holder and attached tool accurately and quickly to the tool head or turret member and in position to perform a machining operation.

Another object is to provide an improved tool holder construction wherein the angle that the tool makes with the workpiece is adjustable by two opposed screws which bear against notches in a disk portion forming a part of the holder.

This construction provides a means for positively locking the tool holder against movement in either direction, giving the utmost rigidity to the mechanism.

Still another object is to provide an improved turret type tool holder wherein the different tools as required for machining a part can be mounted as a group on the turret and instantly locked into proper working position.

Another object is to provide an improved tool holder for machines of the last mentioned type which is adapted to carry all of the tools necessary for a particular cycle of lathe operations to complete a part without removing or resetting the working tools.

Another object is to provide an improved turret tool holder wherein the tools can be changed and adjusted to position the desired tool in accurate and exact relation to the work very rapidly and with the least amount of manipulation of the parts and without requiring the use of auxiliary tools.

Another object is to devise a turret tool holder wherein one or more of the tool bits may be removed, reground and replaced without disturbing the other tool bits or necessitating their regrinding to keep them at the same radial distance from the center of the turret; this is accomplished through micro-adjusting screws provided with each bit. The object of maintaining the tool bits at the same radial distance is to make possible the use of the cross feed dial as a direct reading scale for diameters of the work.

Another object is to provide an improved locking means for positively and rigidly retaining the turret against rotation during machine operations by locking the same with a longitudinally slidable bolt which is beveled on one side only. The straight side providing an accurate locating surface, while the beveled side is utilized as a wedge for bringing the turret portion forming the slot wall tightly against this locating surface of the bolt. In this manner, the turret is speedily and accurately locked in each position to which it is turned for using each of the tools mounted thereon. To take up the shock and thrust accompanying machining operations, the locking bolt is located at a point just under the working bit portion of the tool.

Another object is to devise a novel tool holding cup which is of such a shape that it can be brought solidly up against the face of the turret and locked tightly thereagainst so as to prevent shifting of the tool in a horizontal plane under working stress.

Another object is to provide a novel tool cup holder whereby tools used for machining any particular parts can be marked and stored attached to an individual tool cup holder. When it is desired to duplicate the machining operations it is only necessary to order the appropriate tool cup and mount the same on the turret.

Another object of this invention is to provide an improved turret type tool mechanism wherein a squared surface engageable with a corresponding squared surface on the holder is arranged at right angle to the turret shaft whereby the cutting tool can be quickly and accurately positioned relative to the work piece.

Another object of this invention is to provide an improved tool attachment as described comprising a master disc tool holder member having a right angle face portion normal to the axis of rotation of the disk and wherein the master disc is arranged to hold a plurality of interchangeable individual tool holder cups which have right angle faces engaging the right angle face portion of the master disc so as to insure precise, identical and accurate alignment of the tools irrespective of the tool cup holder which may be mounted on the master disc.

Another object is to provide an improved turret tool holder wherein the side wall of the cutting tool is held accurately parallel with the face of the master disc and also parallel with the abutting faces of the master disc and tool cup holder.

It is a further object of this invention to provide a plurality of independently adjustable cup-like tool holders or supports mounted in the face of a master disc which is rotatable about its center and wherein the individual tool cup holder means are rotatable about their centers whereby each cutting tool can be independently adjusted with respect to the center of the work piece.

It is a further object to provide in a mechanism as described micrometer adjustments for each of the independent tool supporting members and similar micrometric adjustment means for the master disc holder or supporting head member.

A further object is to provide an improved turret type tool mechanism wherein means is provided for accurately positioning, adjusting and locking the cutting tool in precisely the same manner each time it is mounted or adjusted and wherein any tendency for displacement, canting, twisting or misalignment of the cutting tool in adjusting or mounting the same is prevented. To this end, the individual tool cup-like holders are shaped and fitted into the master disc so that the inner surface of the tool cup or holder does not engage with the master disc adjacent the inner face surfaces but only along an accurately machined squared peripheral surface portion so that it is possible to interchange the individual cutting tools and accurately clamp them to the master disc without changing the original setting and alignment of the cutting tools relative to the work.

It is a further object to provide in a mechanism as described a cutting tool clamping member which is positioned so that it forces the cutting tool against two right angle faces of the cup-like tool holder to hold the tool in accurate alignment with the tool cup holder whereby uniform angular positioning of the working tool relative to the work can be effected at all times.

Still another object is to provide an improved operating mechanism for indexing the tool so as to present the next working tool in position for machining a work piece, means being provided whereby the unclamping of the turret, rotation, reclamping and locking of the turret in the next working position is effected by movement of a single lever.

These and other objects and advantages will more fully appear from the following description taken in conjunction with the accompanying drawings illustrating, by way of typical examples, some preferred structural forms embodying my invention.

In the drawings:

Fig. 2 is a side elevational view of the turret tool holder, as illustrated in Fig. 1, omitting certain parts of the lathe in the interest of clearness and showing in section the construction for pivotally mounting the turret tool holder onto the cross feed member of the lathe.

Fig. 3 is a sectional view taken through the turret tool mounting shown in Fig. 1, substantially on the line 3—3 looking in the direction of the arrows.

Fig. 6 is a fragmentary perspective view of the mechanism for locking and unlocking the turret tool holder against rotary movement.

Fig. 7 is a detailed view in perspective of the rotatable member for actuating the locking and unlocking mechanism for holding the turret tool holder in position during machining operations.

Figs. 8 and 9 are fragmentary detailed views of the mechanism utilized for shifting the bolt into and out of position to lock the turret tool holder. These figures are taken substantially on the line 8—8 of Fig. 6 and illustrate the parts in position to lock and unlock the turret tool holder, respectively.

Fig. 10 is a detailed perspective view of a cup-like member for holding the working tool onto the turret.

Fig. 11 is a detailed perspective view of the tool cup showing the adjustable means for clamping the tool in a rigid position on the cup.

Fig. 12 is a detailed view of the tool clamping bar and fastening bolt means for holding the tool onto the cup member.

Fig. 13 is a fragmentary sectional view illustrating the shape of the tool cup holder and mechanism for positioning the cup on the turret.

Figs. 14 and 15 are detailed sectional views taken through the tool cup holder substantially on the lines 14—14 and 15—15 of Fig. 11, respectively, and showing a tool clamped in position in the cup.

Fig. 16 is a detailed perspective view of a tool having a threaded insert to provide longitudinal movement of the tool.

Fig. 17 is a similar perspective view of a tool provided with an adapter carrying a longitudinally threaded section to provide for shifting of the tool longitudinally.

Fig. 18 is a similar perspective view of a tool having a longitudinally threaded section for providing means to shift the tool relative to the tool cup holder.

Fig. 19 is a fragmentary section view of the lead screw positioned in the cup for shifting the tool adapter or tool longitudinally.

Fig. 20 is a detailed view partly in section illustrating the opposed screw members for adjustably positioning the tool cup in the turret and positively locking the tool cup against rotation after the adjustment has been made. The cup illustrated is a modification of that shown in Fig. 11.

Fig. 21 is a fragmentary detailed sectional view taken on the line 21—21 of Fig. 20 illustrating a modified construction of the tool cup member.

Fig. 22 is a fragmentary sectional view taken substantially on the line 22—22 of Fig. 20 looking in the direction of the arrows.

Fig. 23 is an exploded detailed view of the mechanism for clamping the working tool in position in the cup holder.

Fig. 24 is a side elevational view of a portion of a lathe illustrating the mounting of the turret tool holder of this invention on the tail stock of the lathe.

Fig. 25 is a fragmentary sectional view taken on the line 25—25 of Fig. 24 and looking in the direction of the arrows.

Figure 1:
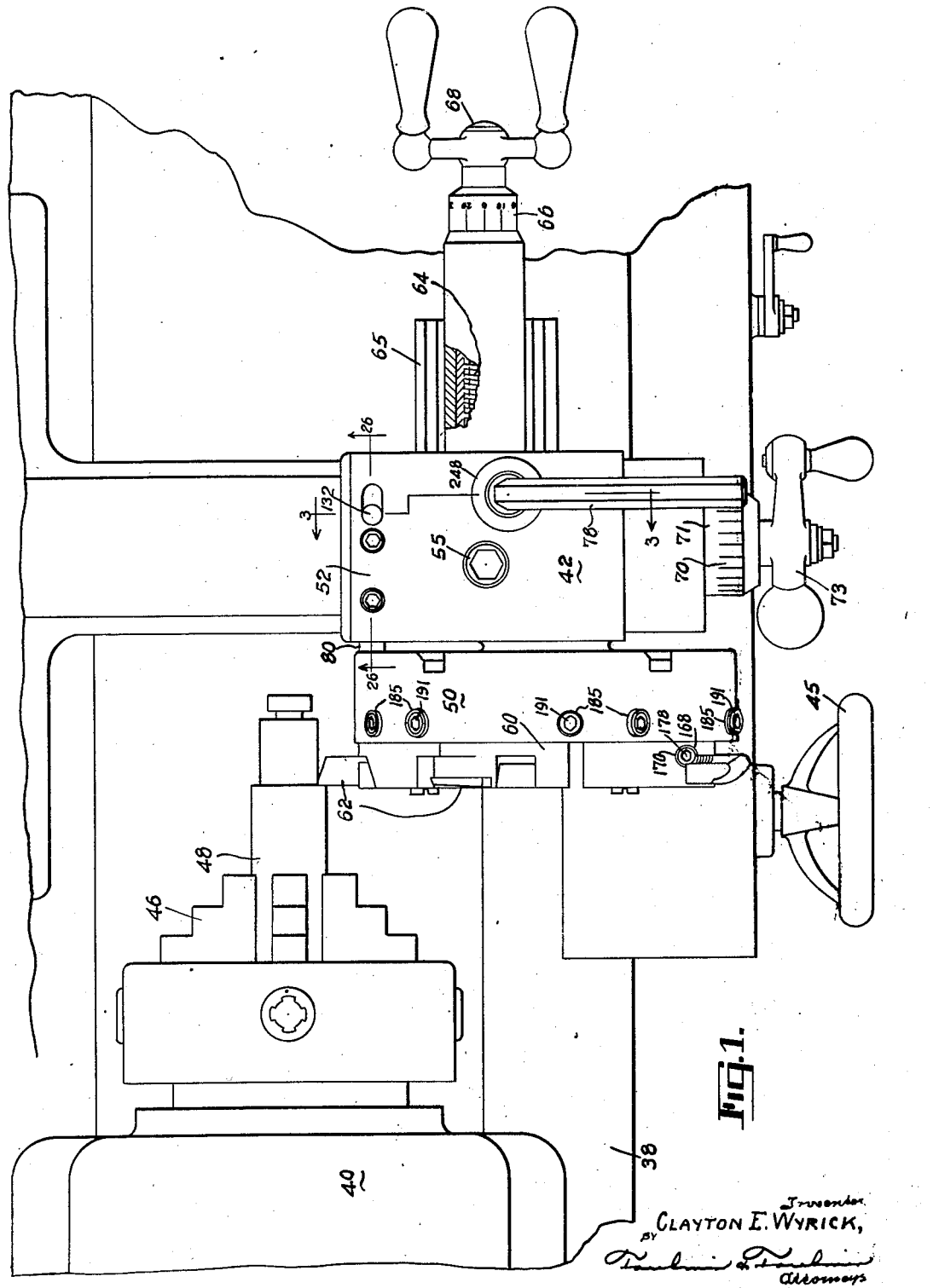
Fig. 1 is a plan view of a lathe partly broken away showing my improved turret tool holder mounted for operation on the cross feed member of the lathe.

Fig. 26 is a fragmentary sectional view taken substantially on the line 26—26 of Fig. 1 and looking in the direction of the arrows.

Fig. 27 is a plan view of a lathe partly broken away showing the mounting of my improved cup tool holder member on the cross slide of a lathe without the use of a turret.

Fig. 28 is a fragmentary sectional view through a modified cup tool holder construction for holding a working tool at an angle to the workpiece and taken substantially on the line 28—28 of Fig. 29.

Fig. 29 is a side elevational view taken substantially on the line 29—29 of Fig. 27 and looking in the direction of the arrows.

Fig. 30 is a fragmentary sectional view taken on the line 30—30 of Fig. 27.

Fig. 31 is a fragmentary sectional view taken on the line 31—31 of Fig. 27 and looking in the direction of the arrows.

Fig. 32 illustrates in fragmentary sectional views different types of chucks mounted on tool cup holder members for holding different cutting tools.

Fig. 33 is a detailed view illustrating the adjustable mounting of a bushing type cutting bar tool whereby the tool can be shifted laterally relative to the tool cup holder.

Fig. 34 is a detailed sectional view taken substantially on the line 34—34 of Fig. 33 looking in the direction of the arrow.

Fig. 35 is a perspective view of a mechanism for positioning the tools on the turret holder which is partly broken away whereby each of the working tool bits can be set an equal distance from the center of the turret.

Fig. 36 is a fragmentary rear view of the mechanism shown in Fig. 35.

Figure 5:
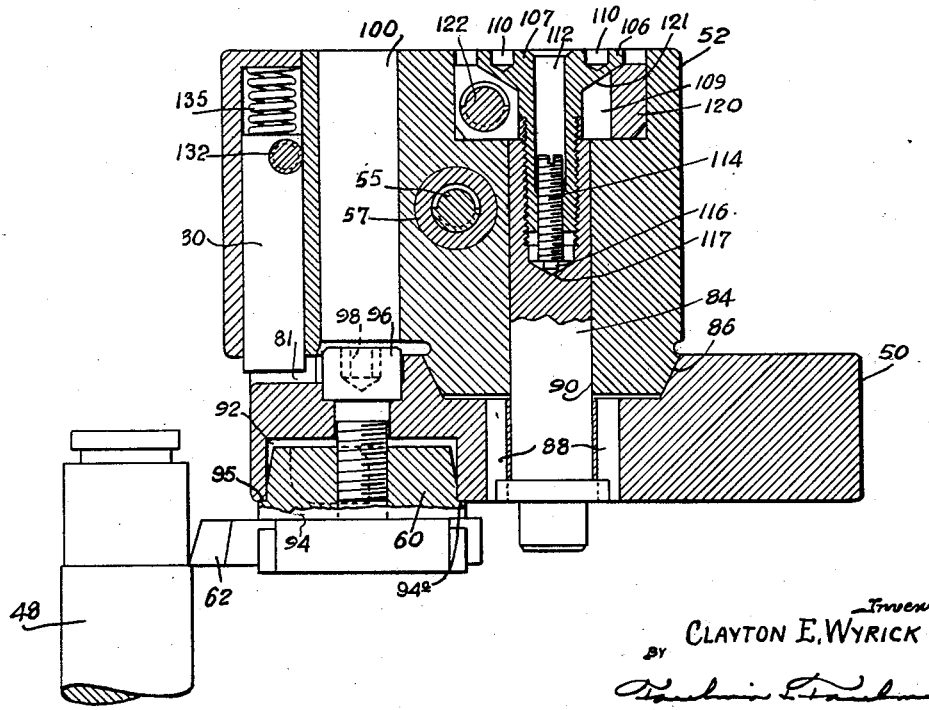
Fig. 5 is a sectional view taken substantially on the line 5—5 of Fig. 4.

Fig. 37 is a sectional view, similarly as Fig. 5, illustrating a modification wherein common means is provided for unclamping, releasing and rotating the master disc tool holder on the head member or support whereby different cutting tools can be quickly and accurately positioned relative to the work piece.

Fig. 38 is an elevational view of the mechanism shown in Fig. 37, certain parts being broken away and shown partly in section substantially on line 38—38 of Fig. 37 to illustrate the mechanism more clearly.

Fig. 39 is a fragmentary detail view in perspective illustrating the mechanism for unlocking the master disc tool holder.

Fig. 40 is a fragmentary detail perspective view of the mechanism for locking the indexing wrench member to the master disc to effect the indexing movement of the master disc tool holder from one position to the next whereby different tools mounted on the master disc can be presented to the work piece.

Referring to the drawings in detail, there is illustrated in Fig. 1 a lathe bed 38 comprising the head stock 40 and cross feed carriage generally designated 42 which is slidable in the way means 43 by turning the hand wheel 45. Mounted on the head stock 40 is a chuck member 46 which is adjustable for clamping a workpiece 48 in position to be machined as illustrated in Fig. 1. For holding the working tools there is provided a master disc-like turret tool holder member generally designated 50, which is rotatably positioned on the cross feed carriage 42. This turret tool holder member is provided with a head portion 52 which is secured onto the carriage portion 53 of the cross feed carriage by means of the pivot bolt 55 threaded into a T-shaped sleeve member 57 retained in the opening 58 of the member 53, as illustrated in Figs. 2 and 31.

Figure 4:
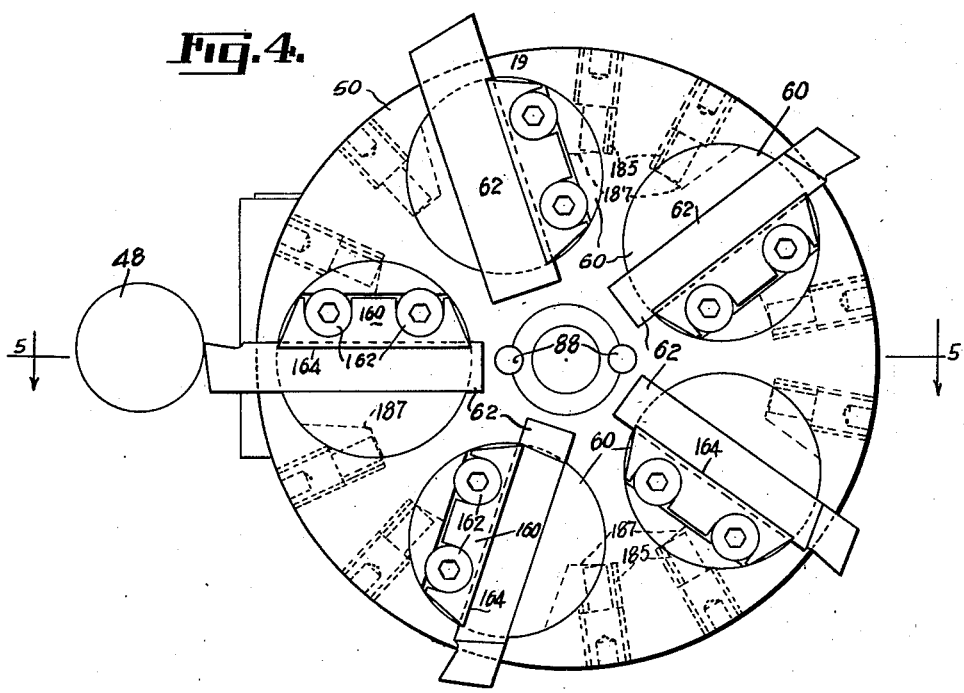
Fig. 4 is a detail face view in elevation of my turret tool attachment.

The master tool holder disc 50 is provided with a plurality of rotatable cups generally designated 60 which are adapted to adjustably retain the working tool members generally designated 62 thereon as illustrated in Fig. 4. Longitudinal movement of the turret tool disc 50 and associated mechanism is made by turning lead screw 64 and the mechanism slides in the way 65 on the member 42. Micro-adjustment of the longitudinal movement of the turret is provided for by the micrometer screw portion 66. Rotation of the screw 64 and scale member 66 is effected through the manual handle means 68. A similar means for measuring the cross feed movement of the carriage 53 and turret tool holder is provided for by the micrometer screw 70. Movement of the cross feed screw member 71 is effected through the manual lever 73.

In mounting the turret head member 52 onto the cross feed carriage 53, there is positioned a spacer or shim member 75 therebetween to set the turret head at the desired height on the cross feed carriage. This use of the spacer is made when the turret tool is mounted on the lathe and the spacer is of the proper thickness to bring the tool bits to the correct height. Thereafter, the spacer or plate 75 remains as a part of the attachment. After the turret tool holder 50 is mounted on the carriage portion 53, it is secured firmly in position by screwing down the bolt member 55. Lever 78 is used to lock and unlock the turret so that the same can be rotated to bring the different working tools against the workpiece.

In order to provide the utmost rigidity to the tool holder and turret mechanism, a longitudinally shiftable bolt lock means 80 is arranged to be inserted into a notch 81 on the turret 50 immediately adjacent the working tool 62 as shown in Fig. 1. This provides a positive means for holding the turret and tool rigidly and solidly against the work during the machining operation so that no vibration or chattering of the parts is brought about.

*Turret tool holder locking and releasing mechanism*

As shown in Figs. 3, 4, 5 and 6, the turret 50 is mounted on the spindle 84 positioned in the turret head 52, as shown in Fig. 5. The outer end of member 52 is fitted into the turret 50 along the beveled annular portion 86. By providing the beveled annular portion 86 on the head member 52 and complementary surfaces on the turret, the turret can be drawn against the head member 52 and locked by the slidable bolt 80 so as to provide a solid, rigid structure for supporting the tool against the workpiece during machining operations. The pin members 88 retain the turret onto the spindle 84, which is locked to the turret and turns with it and the bearing surface 90 on spindle shaft 84 is enclosed so that no foreign particles can contact the bearing surfaces.

The cup members 60 upon which the tools 62 are mounted are shaped to be inserted in openings 92 provided in the face of the turret as shown in Figs. 4 and 5. The tool cup holders 60 comprise an annular shoulder 94 having a machined annular surface 94a which engages a corresponding dressed surface 95 of the master disc turret member 50. With reference to Fig. 5, the face 95 is machined to a smooth plain surface precisely normal to the axis of rotation of the turret 50. In this manner, the mounting of the tool holder, which also has a corresponding normal face 94a, is maintained accurate for each operation and with the use of various tool cup holders. The side walls of the tool holders 60 are tapered merely to aid in inserting the holder in the recess 92 when mounting the tool onto the master disc turret means 50. A central attaching bolt 96 extends through the rear side of the turret and threads into the body portion of the cup and pivotally secures the tool holder to the turret 50 for rotary adjustment about the bolt as an axis, when the bolt is rotated to loosen the tool cup holder 60 in the recess 92, as shown in Figure 5. Following such rotary adjustment of the tool cup holder the bolt is rotated in the opposite direction to draw the holder into the recess and to fixedly retain the holder and tool in adjusted position. The head of the stud bolt 96 is provided with a countersunk portion 98 for receiving a wrench or operating tool. The opening 100 extends through the turret head 52 as shown in Figs. 3 and 5 which provides an aperture for receiving the spindle member 102 when the turret tool holder mechanism is mounted on the tail stock of a lathe or similar machine as shown at 104 in Fig. 25.

In order to rigidly maintain the turret 50 against the head member 52, an adjusting screw member 106 is arranged to thread into the end of spindle 84 as shown in Fig. 5 and the head portion 107 extends into the opening 109. On the head 107, countersunk portions 110 are provided for receiving a wrench or tool for adjusting the screw 106. The screw 106 is provided with a hollow end portion 112 and a set screw 114 is arranged to thread through the bottom or end portion 116 so as to engage against the end of the spindle as shown at 117. In this way, after positioning the screw 106 in the desired position to permit axially shifting the turret away from the head 52 to release the same for rotation, the set screw 114 will be turned down to lock the screw from further movement as shown in Fig. 5. The inclined surface 121 on the under side of the head portion 107 of the screw member 106 rests on the split ring member 120 which ring is adapted to be drawn together and moved apart by means of the screw member 122 by turning the handle 78, as shown in Figs. 5 and 6.

In operation, when it is desired to rotate the turret tool holder after performing one operation with a tool, the handle 78 is grasped by the operator and turned to rotate the screw 122 and open the ring member 120, permitting axial movement of the member 106 and spindle 84. At the same time, it will be observed that rotation of the member 124 is effected to engage the shoulder 125 with the portion 127 on the rod 128 moving the cam section 130 against the pin 132 to reciprocate the rod 80 against the spring 135. In this manner, the turret 50 is released from the head 52 whereby it can be readily rotated. Screw member 122 comprises a socket head member 137 which is adapted to receive the end portion of the lever 78 for manipulating the clamping ring 120 to lock and unlock the turret tool holder. The screw member 122 is adjustably secured to the cam actuating member 124 by means of the screws 139 as shown in Fig. 6.

Rotation of the lever 78 in one direction by the operator simultaneously withdraws the bolt 80 from the slot 81 in the turret and automatically releases the clamping ring 120 from the member 106, permitting the free rotation of the turret 50 carrying the working tools 62. In this improved mechanism, it is to be noted that the working stress transmitted by the tool during machining of a workpiece is carried directly by the bolt 80 which is rigidly held in the head 52. This relieves any stress upon the rotary mechanism of the turret and eliminates any possibility of vibration or relative movement of the parts supporting the tool so that accurate machining of the different workpieces can be effected with the same setting of the working tool holder.

As illustrated in Figs. 6 and 26, the bar 80, which is shiftable to engage in the notches 81 of the turret, is accurately machined along its uppermost edge as shown at 141 in Fig. 26 so as to engage the adjacent wall 142 of the notch 81 of the turret so as to accurately locate the turret relative to the head 52 which forms a part of the cross feed carriage member. Further, as shown at Fig. 26, the side of the bolt opposite the machined straight edge portion 142 is a beveled surface 144 which permits ready movement of the locking bar into the slot. This beveled head portion of the bar 80 also provides a wedge for bringing the surfaces 142 and 141 in contact so as to accurately position the turret tool holder. As shown in Fig. 26, guide means 146 are provided with adjustable stud screw members 148 for aligning the bolt 80 in the aperture 149. The locking bolt is located at a point just under the tool so as to absorb the thrust exerted by the working tool during machining operations.

*Individual tool holder cup mechanism and positioning means*

Referring to Figs. 10, 11, 12, 13, 14, and 15, there is illustrated a preferred structural embodiment of the cup for retaining the individual tools onto the face of the turret as illustrated in Fig. 4. The cup illustrated in Figs. 10 and 11 comprises a circular body portion 150 having a square shoulder 152 and an extending portion 154 of smaller diameter. Portion 154 comprises the beveled side surface 156 so as to assist in positioning the cup into the opening 92 in the turret, as illustrated in Figs. 5 and 13.

The cup member generally designated 60 is retained in the opening 92 by the stud bolt 96, as shown in Figs. 5 and 10. The face of the cup portion 150 is provided with a transverse slot 158 which is adapted to receive a working tool such as is generally designated 62. For clamping the tool in slot 158 of the cup member, there is provided a removable clamping bar 160 which is retained in position by the stud bolts 162 as shown in Fig. 11. The stud bolt members 162 comprise an enlarged head portion having the inclined side surfaces 163 which engage corresponding surfaces on the clamping bar 160 so that when the bolts are screwed down into the head portion 150, they force the bar 160 against the tool so as to pin it securely to the cup member as shown in Fig. 15. This clamping bar 160 is provided with a longitudinally extending lip portion 164 which is adapted to engage over the tool 62 as illustrated in Figs. 14 and 15 to pin the tool into the slot 158. A pin 165 is provided on tool clamping bar 160 and engages in an aperture 166 of the body portion 150 so that the member 160 will not fall out of the cup when the bolts 162 are loosened to remove or adjust the position of the tool.

To provide for adjusting the tool in the cup member, an additional slot 168 is arranged in the lowermost portion of the slot 158 and an adjusting screw member 170 is positioned therein as shown in Fig. 11. Set screw means 172 is positioned in the groove adjacent the end of the adjusting screw 170 so as to locate the screw for rotation in the groove. A smaller groove portion 174 communicates with the larger groove portion 168 to permit access to the opposite end of the adjusting screw 170. The tool 62 comprises a threaded portion 176 which is adapted to be engaged by the adjusting screw 170 to longitudinally shift the tool in the slot 158.

In order to rotate the adjusting screw 170, the end of the screw comprises a socket portion 178 for receiving a tool which is inserted through the slot 168. For identifying the particular tool cup and attached tool, there is preferably formed in the cup a slotted portion 180 for receiving an identification tag 181. In order to retain the identification tag 181 in the slot 180, a small groove 183 is formed in the central portion of the slot 180 and a portion of the tag 181 is forced into this groove so as to lock it in place after it has been inserted. Tool bits, as used for performing any machining operation or set of operations, such as required in the making of a particular article, may be mounted in tool cup holders and identified with a tag bearing a number or indicia, as shown in Fig. 11, whereby they can be stored in a tool crib and requisitioned when they are needed. This greatly simplifies the setting up of the machine to perform machining operations and speeds up the production.

*Tool adjusting mechanism*

As illustrated in Figs. 10, 20, and 30, adjustment of the angle which the tool makes with the workpiece is effected by the two opposed screws 185 which extend through the side wall of the turret and bear against the shoulders 187 of the notches 189 in the reduced diameter portion 154 of the tool cup. This construction provides a positive lock against rotation in either direction, which is an important factor when the boring tools are mounted in the tool cup for performing boring operations. The outer ends of the adjusting screws 185 may comprise a countersunk socket head 191 for receiving an operating tool as shown in Figs. 1, 2 and 27. As a modification, the adjusting screws may merely be formed to receive a screw driver as illustrated in Fig. 30.

In the modification shown in Figs. 20, 21, 22 and 23, working tool 62 is pinned in the groove portion of the cup by means of the screw 192 and in this instance the clamping bar 194 comprises the beveled inclined side wall portions 196 which are adapted to engage the complementary inclined wall portion 198 of the tool cup and to be drawn down in clamping engagement with the tool 62 by means of the stud bolts 200 as shown in Figs. 22 and 23. In the modification shown, the fastening bolts 200 comprise the enlarged cylindrical head socket portions 201 which engage into the countersunk portion 203 of the clamping bar 194. Pin means 205 is also provided on the bar 194 which is inserted in the bore 207 formed in the tool cup so as to prevent the bar from falling out of the cup when the tool is being adjusted similarly as in the clamping bar 160 shown in Fig. 12.

Similar adjusting screw means for moving the tool relatively transverse of the cup as shown in Fig. 11 is employed. As a modification of the shape of the tool cup, there is shown in Fig. 21 a cylindrical tool cup holder 209 which is shaped to be fitted into the straight bore 211 of the turret body 213. A central retaining stud bolt 96 is utilized to clamp the tool cup against the annular inner wall faces 215 of the turret body 213. These wall portions 215 are accurately machined and face so that the cup will be clamped squarely and solidly against the turret body 213.

*Working tool construction*

In Figs. 16, 17, and 18, there are illustrated the preferred embodiments of the working tool construction for use with my improved attachment. In Fig. 16, the facing tool 217 is provided with a cut-away lower corner portion 219 which extends the length of the tool so that the tool can be reciprocated over adjusting screw means 170 in the tool cup. In this preferred form of working tool, a threaded insert 221 is provided for positioning in the dove-tailed slot 223 formed in the wall 219 and body portion of the tool. In use, the various working tools such as used for roughing, facing, finishing and cutting off will be shaped similarly to that shown in Fig. 16 and provided with a cut-out portion 223 for receiving the threaded insert 221 when the tool is mounted in the tool cup holder, as illustrated in Fig. 14. This eliminates the making of different threaded portions on each tool so that it can be adjusted in the tool cup as illustrated in Figs. 10, 11 and 19.

In the modification shown in Fig. 17, the tool, such as the cut-off tool 225, is provided with an adapter 227 which comprises a threaded section 229 for receiving the adjusting screw 170 in the tool cup. The adapter is provided with a face 230 upon which the tool 225 is mounted. A rear wall portion 232 is formed on the adapter against which the end of the tool 225 is adapted to rest. The tool can be adjusted toward the workpiece when the adjusting screw 170 is rotated in the direction to shift the adapter outwardly.

In Fig. 18, the working tool 235 comprises the threaded portion 237 which extends the length of the tool or substantially so, whereby the tool can be adjusted inwardly or outwardly relative to the tool cup by the adjusting screw 170, similarly as illustrated in Figs. 10 and 11. In this construction, no adapter or insert is used but in each instance the tool comprises a threaded longitudinally extending section such as shown at 237 for receiving the adjusting screw 170 in the tool cup holder as illustrated in Figs. 10, 11 and 19.

In the modification shown in Figs. 27, 28 and 29, the novel tool cup of this invention in which the tool is held is illustrated as mounted on a conventional cross slide carriage of a lathe similarly to that shown in Fig. 1. The tool cup 240 is arranged to be mounted in the circular opening 242 in the head member 244. Head member 244 is retained on the cross feed carriage 246 by means of the bolt 248 which is similar to the fastening bolt 55 and engaging T-bolt 57 illustrated in Figs. 2 and 31 for holding the turret head 52 onto the cross feed carriage of the lathe. A stud bolt 250 extends through the head member 244 and is threaded into the body portion of the tool cup 240 so that the cup can be firmly held in the opening 242. The tool holding cup 240 comprises the annular square shoulder portion 242 against which the outer wall portions 254 of the head 244 engages when the bolt 250 is tightened. In this manner, the tool cup is brought solidly up against the face of the mounting 244. This prevents shifting of the tool in a horizontal plane when under working stress.

For angularly adjusting the position of the tool cup, there is provided the opposed adjusting screws 185 which contact the wall portions 187 in the notches 189 as illustrated in Fig. 30, heretofore described.

Mounting of working tool attachment on tail of lathe machines

One of the novel features of this working tool attachment is that provision is made for mounting the tool holder mechanism on the cross slide or tail stock of the lathe or the like machine whereby boring or drilling machine operations can be performed with the same attachment.

The method of mounting the turret tool holder of this invention on the tail stock of a lathe is shown in Figs. 24 and 25. In this construction, a spindle 102 is positioned in the cylindrical bore 100 in the turret head 52 by means of the locking screws 260 and the outer tapered portion 262 is inserted into the tapered sleeve member 264 carried by the tail stock member 104. Mounted on the turret head 50 are working tools such as shown at 267, 268, 269, 271, and 273. These tools are mounted in the individual chucks 276 which are retained in the tool cup members 278 by means of the bolts 280, similarly as heretofore described for retaining the tool cup in the turret. As illustrated, the tool attachment of this invention is readily adapted for use in performing various types of machining operations such as required for making an article and the attachment can be shifted from the cross feed carriage onto the tail stock of a lathe and operated to perform boring, threading and the like operations on a workpiece so that no additional attachment or accessory equipment is necessary. This greatly lessens the cost of manufacturing machined articles and greatly increases the utility of a lathe machine.

In Figs. 32, 33, and 34, there are illustrated various types of chucks carried by the tool cup and mounting in the turret attachment of this invention. At 282 there is shown a tapered type chuck and at 283 a screw type chuck is illustrated. The chucks 284, 285, 286 and 287 are designed for holding a cutting bar, bushing type machine tool, die and taper tool, respectively.

Figs. 33 and 34 illustrate detail construction of a boring bar mounted on a tool cup. As shown, the boring bar 292 is retained in chuck member 294 by means of the screws 295. The chuck 294 comprises a laterally extending portion 297 which is clamped to the cup 299 by means of the clamping bar 300 similarly as illustrated in Figs. 11, 14 and 15 and as heretofore described. This construction provides means for adjusting the boring tool laterally of the turret when mounted on a cross piece which heretofore could not be done when a boring tool was mounted on a tail stock in the usual way.

Radii adjusting mechanism for the tool bits mounted on the turret

In Figs. 35 and 36, there is illustrated a typical mechanism for positioning the tool bits equally distant from the center of the turret. This mechanism comprises a block 305 having an arcuate end portion 307 with end portions 309 which are adapted to rest on the peripheral surface 310 of the turret when adjusting the tool. A slidable block-like member 312 is arranged to reciprocate in the longitudinal groove 314 formed in block 305. This slidable block comprises a square notch portion 316 for engaging the tool bit, as shown at 318, to roughly position the working tool. The block 312 is held in the groove 314 by the bolt 320 which is adjustable in slot 322 as shown in Figure 36. Attached at the rear side of the member 305 and extending parallel thereto is a leg member 323, which outer end portion is adapted to fit in the locking slot 81 of the turret to accurately locate the tool adjusting mechanism on the turret. Angular adjustment of the tool cup holder 325 is effected by the screws 185 as heretofore described, whereby each tool bit in turn can be properly positioned. For adjusting the tool inwardly or outwardly relative to the tool cup holder 325, a wrench or tool member 327 is mounted on the member 305 and is arranged to be rotatably held in the supporting ear member 328. The end of the tool member 327 is adapted to be extended into the opening 168 to engage in the lead screw head socket 178 (Figure 19) and rotated to turn the adjusting screw 170.

Fine adjustment of the working tool is provided for by the micrometer means 330 as illustrated in Figure 35. After positioning the working tool cup member on the turret, as described, each of the tool bits can be accurately positioned by the micrometer adjusting screw means 330 and wrench or tool member 327 so that each tool bit is the same radial distance from the center of the turret and makes possible the use of the cross feed dial for making a direct reading scale for the diameters of the work. In like manner, the longitudinal feed dial readings may be utilized in conducting accurate machining operations on the workpiece.

Figures 37 through 40 illustrate a modified construction of the turret tool holder shown in Figure 5, whereby the turret can be freed and indexed from one position to another and relocked by rotating a lever attached to the turret head member in one direction and then moving this lever back to its starting position. In this way, the various cutting tools mounted on the turret disc member can be quickly and accurately brought into fixed position for engagement with the work piece by the operator.

Referring to this modification, the master disc turret 50 is mounted for rotation on the outer end of the axle or spindle 350 suitable retained in the head member 352 as shown in Figure 37. The axle 350 is axially slidable in the head member 352 and its inner end is retained in a counter bore portion 353 by means of the nut 354 which is threaded onto the end thereof. A compression spring means 358 is disposed in a central counter bore 360 which is smaller in diameter than the outer bore 353 and is arranged to press outward on the nut 354. The periphery of the nut 354 is provided with teeth 362 which mesh with the pinion gear 364 whereby rotation of the pinion gear tightens or loosens the nut on the end of the axle 350. In this way, the turret 50 is clamped solidly against the head member 352 during the machining operation, and upon loosening nut 354, the turret is freed from clamping engagement with the head member and is readily rotated to index the next tool in position for further machining the work piece. The pinion gear comprises an elongated shaft 366 which is retained in a cylindrical cavity 368 formed in the head member 352. Similar pinion gear teeth 370 are formed on the opposite end of the pinion shaft 366 which is engageable with a gear segment 372 fixed to an operating lever 375. A set screw 376 is provided for securing the pinion gear member 366 against axial movement in the head member 352 while permitting rotation of the pinion gear.

The operating lever 375 is positioned on the head member 352 and comprises the disc-like part 375a. The operating handle 377 of lever 375 is preferably integral with the circular disc-like part 375a which is suitably retained on the cylindrical head member 352 by means of the ring 379 which frictionally holds the disc-like portion 375a against the annular shoulder 381 formed on the head member 352. The gear segment 372 is suitably fastened to the disc by means of set screws 383. For locking the turret against rotation in the head member 352, there is provided a longitudinally shiftable bar 385 which is urged forward by the spring 386 to engage the forward wedge-shaped portion 388 into the notch 390 in the turret, similarly as in the construction shown in Figure 5. In order to effect shifting of the locking bar 385 out of the notch 390 so as to release the turret 50 for rotation, the operating lever 375 carries a dog 392, as shown in Figure 39, which comprises a beveled head portion 394 which is adapted to cooperate with the corresponding beveled surface portion 396 on the locking bar 385 so as to force the locking bar out of the notch 390 when the lever 375 is rotated in the direction indicated by the arrow in Figure 39. The dog member 392 is suitably pivoted, as at 398, to the operating lever portion 400 and is held against the stop pin means 402 by the tension spring member 404 whereby the dog is returned to its operating position after forcing the locking bar 385 to release the turret disc 50. The dog member 392 is permitted to pass the locking bar 385 on the return movement of the lever 375 by swinging of the member about its pivot 398 when the head portion 394 engages the locking bar. After it has passed by the bar 385, the dog is drawn against the stop pin 402 by the spring 404 and is thereby in position to again release the locking bar upon the next indexing cycle.

To bring about rotation of the turret disc member 50 to index the turret to a new position so that another tool can be presented to the work piece, a spring pressed lug member 406 is suitably attached to the operating lever 375, as shown in Figures 38 and 40. The spring member 407 urges the inward turned head portion 408 of the member 406 against the periphery of the turret. Member 406 is pivoted to the disc-like portion of the operating lever and shaped to engage in one of the notches 390 in the turret head as the lever 375 is rotated. A beveled surface portion 409 on the lug 406 permits the lug to move out of the notch 390 when the lever is rotated in the opposite direction. In this arrangement, the turret 50 is rotated in only one direction.

In the operation of the modified construction shown in Figures 37 and 38, when the operator grasps the handle 377 of the operating lever 375 and pulls it downwardly, the gear segment 372 rotates the pinion gear 364 and loosens the nut 354 on the end of the axle 350 releasing the turret 50 from the surfaces 410 of the head member so that it can turn. Further movement of the handle 377 brings about the movement of the dog 392 against the beveled surface 396 of the locking bar 385 so as to force it out of locking position with the turret. Continued movement of the operating lever 375 effects the engagement of the lug 406 in a notch 390 of the turret and rotation of the turret is effected by further movement of the lever. After sufficient movement of the turret has been made to bring the next tool in position for locking in place, the bolt 385 engages in the notch 390 adjacent the succeeding tool and securely locks the turret in place against further movement. After this has taken place, the operating lever 375 is returned to its original position and by so doing, the pinion gear 364 is turned in the opposite direction so as to thread the nut 354 onto the axle shaft 350 to thereby clamp the turret firmly against the supporting head surface 410 and rigidly hold the turret in position for performing the next machining operation.

In the tool attachment mechanism illustrated in the drawings, it will be observed that there is no obstruction to prevent the tool from working up close to the chuck or workpiece holder so that small workpieces can be machined. Further, the tool attachment of this invention is adapted for performing geenral lathe work and provides the various tools as required instantly and by merely actuating a single lever, the turret attachment is rigidly locked in place. The construction of the attachment provides an improved tool holder which, during machining operations, is solidly locked against movement or vibration and positive locking of the tool in position on the turret is provided. Further, all moving parts are protected from contact with foreign matter during machining operations so as to provide a highly efficient, durable tool attachment.

It will be understood that this invention is not limited to the particular construction illustrated in the drawings and that changes can be made to suit different conditions and uses without departing from the spirit of my invention.

Having thus fully described my invention, what I claim as new and desire to secure by Letters Patent is:

1. In a machine of the type described, the improvement comprising a master disc turret tool holder member having a right angle face portion normal to the axis of rotation of said disc, and a plurality of interchangeable individual tool holder cup members adjustably positioned on said master disc, said individual turret holder cup members having right angle faces engageable with said right angle face portion of the master disc whereby accurate alignment of the tools irrespective of the tool cup holder may be effected when mounting the individual tools on said master disc.

2. In a turret type tool attachment for machines of the character described comprising an improved turret tool holder including a master disc on which there is mounted a plurality of individual tool holder members for fixedly retaining tool means thereon, said individual tool holders comprising accurately faced surface portions engageable with similar faced surface portions on said master disc, and means for positioning said tool means accurately parallel with the face of the master disc, said master disc being rotatable about its center wherein the individual tool means are indexed into position for performing machining operations.

3. In a turret type tool attachment for machines of the character described comprising an improved turret tool holder including a master disc on which there is mounted a plurality of individual tool holder members for fixedly retaining tool means thereon, said individual tool holders comprising accurately faced surface portions engageable with similar faced surface portions on said master disc, and means for positioning said tool means accurately parallel with the face of the master disc, said master disc being rotatable about its center wherein the individual tool means are indexed into position for performing machining operations, said individual tool cup holder means being rotatable about their centers whereby each cutting tool can be independently adjusted with respect to the center of the work piece.

4. In a machine for boring, drilling and machining workpieces, means comprising a turret tool holder for retaining a plurality of tools thereon, rotatable cups supported for axial adjustment on said tool holder and each containing a tool, means for removably locking said cups on said turret, means for adjustably clamping each tool to said cup member, and means comprising opposed positively acting adjusting members constructed and arranged to rotatably and independently position each cup relative to said turret.

5. In a machine for performing machining operations on workpieces comprising a main tool holder and means for adjustably positioning said tool holder on said machine, a plurality of cup-shaped members arranged to fit recesses in said tool holder and for supporting individual tools thereon, means for independently adjustably positioning each of said cup-shaped tool holders on said main tool holder about independent axes, means to effect radial adjustment of each tool in its cup-shaped holder, and means for removably clamping each tool in its cup-shaped holder, said adjusting and clamping means being independent of said axial adjusting means.

6. An improved tool holder for retaining machine tools comprising a rotatable cup provided with a transverse slot to receive a working tool, means for supporting said cup in a base member, a removable clamping bar having a lip for engaging the face of said working tool, and stud bolt members having enlarged tapered heads to fit cooperating tapered surfaces on said cup and clamping bar for wedgingly clamping said bar and working tool to said cup.

7. An improved tool holder for retaining machine tools comprising a rotatable cup provided with a transverse slot, a working tool in said slot, a removable clamping bar in said slot provided with a retaining lip for engaging the outer face of said tool, and means for clamping said bar and tool to said cup comprising removable stud bolts threaded to said cup and having tapered heads to engage cooperating tapered surfaces in the walls of said slot and clamping bar for wedgingly clamping said bar and working tool to said cup.

8. A tool holder consisting of a body, a slot in said body for receiving a tool and having juxtapositioned walls disposed angularly with respect to one another for engaging adjacent walls of a tool positioned in said slot, a movable member in said slot having a wall for engaging another wall of the tool positioned in said slot in addition to the walls of the tool engaged by said slot, a ledge projecting angularly from said movable member and having a wall to engage still another wall of a tool positioned in said slot and between said walls of said slot and said movable member, and means engaging said movable member for moving the same in directions toward both of said slot walls simultaneously to thereby confine a tool between said slot walls and said movable member and forcefully grip the same between said slot walls and said walls on said movable member and ledge.

9. A tool holder consisting of a body, a slot in said body for receiving a tool and having juxtapositioned walls disposed angularly with respect to one another for engaging adjacent walls of a tool positioned in said slot, a movable member in said slot having a wall for engaging another wall of the tool positioned in said slot in addition to the walls of the tool engaged by said slot walls and a second wall positioned angularly to the first mentioned wall to form a wedge shaped cross-sectional area in at least a portion of said movable member, a ledge projecting angularly from said movable member and having a wall to engage still another wall of a tool positioned in said slot and between said walls of said slot and said movable member, and means engaging said angularly positioned wall on said movable member for moving the same in directions toward both of said slot walls simultaneously to thereby confine a tool between said slot walls and said movable member and forcefully grip the same between said slot walls and said walls on said movable member and ledge.

10. A tool holder consisting of a body, a slot in said body for receiving a tool and having juxtapositioned walls disposed angularly with respect to one another for engaging adjacent walls of a tool positioned in said slot, a movable member in said slot having a wall for engaging another wall of the tool positioned in said slot in addition to the walls of the tool engaged by said slot walls and a second wall positioned angularly to the first mentioned wall to form a wedge shaped cross-sectional area in at least a portion of said movable member, a ledge projecting angularly from said movable member and having a wall to engage still another wall of a tool positioned in said slot and between said walls of said slot and said movable member, and means movable into said slot having a tapered portion thereon for engaging said angularly positioned wall on said movable member for moving the same in directions toward both of said slot walls simultaneously to thereby confine a tool between said slot walls and said movable member and forcefully grip the same between said slot walls and said walls on said movable member and ledge.

11. In tool holders for machines, a support body having a machine finished planar surface on one wall thereof, a bore extending into said body from said surface and normal thereto, said surface extending beyond the periphery of said bore, a tool holder body for holding a tool having a finished planar shoulder thereon engaging said planar surface on said support body to square said tool holder upon said support body, a boss on said tool holder body extending from said planar shoulder having a peripheral surface normal to said planar shoulder immediately adjacent said shoulder, said surface on said boss having a width which is only a small portion of the depth of said bore and the remaining length of said boss having a smaller periphery than the periphery of the bore to relieve the boss from engagement with the bore to thereby axially align said boss on said tool holder body in said bore in said support body by said peripheral surface, and means extending between said support body and said tool holder body to retain said boss within said bore and said shoulder on said planar surface on said support body.

12. In tool holders for machines, a support body having a machine finished planar surface on one wall thereof, a circular bore extending into said body from said surface and normal thereto, said surface extending beyond the periphery of said bore, a tool holder body having a circular boss thereon for extending into said bore, a machine finished annular surface on the periphery of said boss parallel and coaxial with the axis of said boss for engaging the inner periphery of said bore to position said boss coaxial with said bore, said surface on said boss having a width which is only a small portion of the length of said boss and the remaining length of said boss having a smaller periphery than the periphery of said bore to relieve the boss from engagement with the bore whereby said surface provides the sole means for coaxially aligning said boss in said bore, a machine finished shoulder on said tool holder body extending from said surface on said boss and normal thereto for engaging said planar surface on said support body to thereby position the axis of said boss normal to said planar surface, and means extending through said support body from the face thereof opposite to said planar surface on said support body into engagement with said boss for drawing said shoulder into engagement with said planar surface to thereby hold the axis of said boss normal to said planar surface.

13. A tool holder consisting of, a body having a recess therein provided with adjoining walls angularly disposed relative to each other and adapted to be engaged by corresponding adjoining walls of a tool, means movable within said recess having adjoining walls angularly disposed relative to each other on one side thereof for engaging corresponding adjoining walls of a tool opposite to the first mentioned adjoining walls of the tool and a taper wall surface on the opposite side thereof, and means having a tapered portion thereon disposed between said taper surface and a wall of said recess for forceably engaging said taper surface to move said movable means in said recess to cause said adjoining walls of said movable member to move toward said adjoining walls of said recess whereby to squeeze-clamp a tool therebetween.

14. A tool holder consisting of, a body having a recess therein provided with adjoining walls angularly disposed relative to each other and adapted to be engaged by corresponding adjoining walls of a tool, means movable within said recess having adjoining walls angularly disposed relative to each other on one side thereof for engaging corresponding adjoining walls of a tool opposite to the first mentioned adjoining walls of the tool and a taper wall surface on the opposite side thereof, and screw means having a tapered head thereon disposed between said taper surface and a wall of said recess for forceably engaging said taper surface to move said movable means in said recess to cause said adjoining walls of said movable member to move toward said adjoining walls of said recess whereby to squeeze-clamp a tool therebetween.

15. A tool holder that consists of, a body having adjoining surfaces forming two sides of a quadrilateral figure, a member movable relative to said body having adjoining surfaces co-operating with the first mentioned adjoining surfaces and forming at least in part the two opposite sides of the quadrilateral figure, a taper surface on said member, and means having a tapered portion thereon engaging and disposed between said taper surface and a part of said body for moving said member toward both of said first mentioned adjoining walls whereby to squeeze-clamp a tool on said body.

16. In tool holders for machines, a support body having a planar surface on a wall thereof, a bore extending into said body from said surface and normal thereto, a tool holder body having means forming the wall surfaces of a quadrilateral figure at least a part of said wall surface forming means being movable to squeeze-clamp a tool within the confines of the wall surfaces, a planar surface on said tool holder body parallel with at least one of the surfaces forming the quadrilateral figure and engaging said planar surface on said support body whereby to square said tool holder body upon said support body, a boss extending from said tool holder body into said bore, an annular surface on the periphery of said boss normal to said planar surface on said tool holder body and parallel and coaxial with the axis of said boss and said bore for engaging the inner periphery of said bore, said surface on said boss having a width which is only a small portion of the depth of said bore and the remaining length of said boss having a smaller periphery than the periphery of said bore to relieve the boss from engagement with the bore to thereby axially align said boss in said support body and said peripheral surface, and means extending between said support body and said tool holder body to retain the same thereon.

17. A machine tool for mounting upon the cross slide of a lathe that includes the combination of, means forming a support member, a spindle extending through said support member and having a turret head supported on said spindle, protruding taper means on said support member co-operating with tapered recess means in said turret head for frictionally preventing rotation of said turret head relative to said support member, split ring means positioned coaxial with said spindle, means engaging said spindle and having taper means thereon engaging said split ring means, and means for opening and closing said split ring means to cause said last mentioned taper means to axially move said spindle and thereby engage or disengage said tapered recess means with said tapered protrusion.

18. A machine tool for mounting upon the cross slide of a lathe that includes the combination of, means forming a support member, a spindle extending through said support member and having a turret head supported on said spindle, taper means on said support member co-operating with taper means on said turret head for frictionally preventing rotation of said turret head relative to said support member, split ring means coaxial with said spindle, means engaging said spindle having taper means thereon for engaging said split ring means, and means for closing and opening said split ring means whereby to move said spindle axially to frictionally bind or release said turret head from said support.

19. A machine tool for mounting upon the cross slide of a lathe that includes the combination of, means forming a support member, a spindle extending through said support member and having a turret head supported on said spindle, taper means on said support member co-operating with taper means on said turret head for frictionally preventing rotation of said turret head relative to said support member, split ring means coaxial with said spindle, means engaging said spindle having taper means thereon for engaging said split ring means, means for closing and opening said split ring means whereby to move said spindle axially to frictionally bind or release said turret head from said support, and means for axially adjusting said means engaging said spindle to regulate the frictional tightness of said turret head upon said support as transmitted thereto upon closure of said split ring.

20. A machine tool for mounting upon the cross slide of a lathe that includes the combination of, means forming a support member, a spindle extending through said support member and having a turret head supported on said spindle, taper means on said support member co-operating with taper means on said turret head for frictionally preventing rotation of said turret head relative to said support member, split ring means coaxial with said spindle, means engaging said spindle having taper means thereon for engaging said split ring means, means for closing and opening said split ring means whereby to move said spindle axially to frictionally bind or release said turret head from said support, bolt means slidably disposed in said support member for engaging slot means in said turret head adjacent the periphery thereof to regulate indexing movement of said turret head, an actuating member operably interconnecting said bolt means and said means for closing and opening said split ring, and means actuated simultaneously with actuation of said means for closing and opening said split ring means for operating said actuating member and thereby removing said bolt means from engagement with said turret head concurrently with opening of said split ring means and vice versa.

21. In a machine tool, the combination of, a support member, a turret head, means rotatably supporting said turret head upon said support member, locking means coaxially arranged with said last mentioned means for axially moving the same for locking said turret head upon said support member to prevent rotation thereof, a second locking means movably disposed in said support member for engaging said turret head adjacent the periphery thereof for positive prevention of rotation of said turret head, actuating means operably interconnecting both of said locking means, and means for actuating said first mentioned locking means and said actuating means whereby to simultaneously actuate said second locking means.

22. A tool holder that consists of, a body having adjoining surfaces forming two sides of a quadrilateral figure, a member movable relative to said body having adjoining surfaces co-operating with the first mentioned adjoining surfaces and forming at least in part the two opposite sides of the quadrilateral figure, means for moving said member toward both of said first mentioned adjoining walls whereby to squeeze-clamp a tool on said body, and rotatable means positioned at the juncture of the first mentioned adjoining surfaces for engaging a tool positioned against the said adjoining surfaces to move the tool thereover and adjust the extension of the tool beyond said body.

23. A tool holder consisting of, a body having a recess therein provided with angularly disposed adjoining walls adapted to be engaged by adjoining walls of a tool that is positioned in the recess, a member movable within said recess having a wedge shaped portion thereon and having angularly disposed adjoining walls on one side thereof for engaging adjoining walls of a tool opposite to those engaged by the first mentioned adjoining walls, and a second wedge shaped member disposed between the wedge shaped portion of the first member and a wall of said recess and engaging the same movable inwardly into the recess to forcibly move said first mentioned wedge shaped member toward both of said first and second mentioned adjoining walls simultaneously whereby to clamp a tool disposed between said first mentioned and said second mentioned adjoining walls.

24. A tool holder consisting of, a body having a recess therein provided with angularly disposed adjoining walls adapted to be engaged by adjoining walls of a tool that is positioned in the recess, a member movable within said recess having a wedge shaped portion thereof and having angularly disposed adjoining walls on one side thereof for engaging adjoining walls of a tool opposite to those engaged by the first mentioned adjoining walls, and securing means having a tapered head thereon engaging the wedge shaped portion of said member and a wall of said recess movable upon the surface of the wedge shaped portion of said member from the thin edge thereof toward the thickened base thereof and backed up by the said wall of the recess whereby to forcibly move said member toward the first mentioned adjoining walls to clamp a tool between said first mentioned adjoining walls and said second mentioned adjoining walls.

25. A tool holder consisting of, a body having a recess therein provided with angularly disposed adjoining walls adapted to be engaged by adjoining walls of a tool that is positioned in the recess, a member movably disposed within said recess having angularly disposed adjoining walls on one side thereof for engaging adjoining walls of a tool opposite to those engaged by the adjoining walls of the recess and having a conical shaped surface portion positioned in the opposite side thereof, and fastening means having a conical shaped head portion disposed between said member and a wall of said recess and engaging the said wall of said recess and the conical shaped surface portion of said member and movable axially of the conical shaped surface portion of said member to cause the same to move toward the first mentioned adjoining walls to clamp a tool between the first mentioned adjoining walls and the second mentioned adjoining walls.

CLAYTON E. WYRICK.